US012429061B2

United States Patent
Lehr et al.

(10) Patent No.: US 12,429,061 B2
(45) Date of Patent: Sep. 30, 2025

(54) METHOD FOR CONTROLLING AT LEAST ONE RADIAL BLOWER IN A COOLING SYSTEM, AND RADIAL BLOWER

(71) Applicant: TEQTONIQ GmbH, Horw (CH)

(72) Inventors: Andreas Lehr, Edlibach (CH); Michael Bütikofer, Affoltem am Albis (CH); David Muri, Kriens (CH); Christian Ambühl, Baar (CH)

(73) Assignee: TEQTONIQ GmbH, Horw (CH)

(*) Notice: Subject to any disclaimer, the term of this patent is extended or adjusted under 35 U.S.C. 154(b) by 457 days.

(21) Appl. No.: 17/047,260

(22) PCT Filed: Apr. 2, 2019

(86) PCT No.: PCT/EP2019/058236
§ 371 (c)(1),
(2) Date: Oct. 13, 2020

(87) PCT Pub. No.: WO2019/197209
PCT Pub. Date: Oct. 17, 2019

(65) Prior Publication Data

US 2022/0307511 A1 Sep. 29, 2022

(30) Foreign Application Priority Data

Apr. 13, 2018 (DE) ..................... 10 2018 108 827.2

(51) Int. Cl.
*F04D 27/00* (2006.01)
*F04D 29/051* (2006.01)
*F04D 29/057* (2006.01)

(52) U.S. Cl.
CPC ....... *F04D 27/001* (2013.01); *F04D 29/0513* (2013.01); *F04D 29/057* (2013.01); *F05D 2270/334* (2013.01)

(58) Field of Classification Search
CPC ............. F04D 17/10–14; F04D 23/003; F04D 25/06–0646; F04D 25/0666;
(Continued)

(56) References Cited

U.S. PATENT DOCUMENTS 4,385,768 A * 5/1983 Swearingen ........ F04D 29/0513 277/412
5,285,457 A * 2/1994 Funakubo ............. F04D 27/001 372/59

(Continued)

FOREIGN PATENT DOCUMENTS

CN 102388223 A 3/2012
CN 102187099 A 1/2014

(Continued)

OTHER PUBLICATIONS

KR20160087299machineTrnaslation; EPO Patent Translate: Jan. 28, 2023. (Year: 2016).*

(Continued)

*Primary Examiner* — Alexander B Comley
(74) *Attorney, Agent, or Firm* — Renner, Otto, Boisselle & Sklar, LLP

(57) ABSTRACT

A method for controlling at least one radial blower in a cooling system. The radial blower includes a housing in which a shaft is rotationally mounted, which receives at least one impeller wheel of a compressor at one end, which is secured to the housing. The housing includes at least one radial bearing and at least one axial bearing via which the shaft is rotationally mounted in the housing. The radial blower also includes a motor which is driven by a rotor and a stator and which drives the shaft. By means of at least one laser Doppler vibrometer assigned to the shaft, operating points of the shaft are detected and forwarded to a controller for determining an operating status of the radial blower.

5 Claims, 3 Drawing Sheets

(58) Field of Classification Search
CPC ................. F04D 27/001; F04D 27/005; F04D 27/007–008; F04D 29/0513; F04D 29/057; F04D 29/668; F05D 2270/334
See application file for complete search history.

(56) References Cited

U.S. PATENT DOCUMENTS

| | | | | | |
|---|---|---|---|---|---|
| 5,380,171 | A * | 1/1995 | Nagaoka | F16C 39/02 | 417/423.4 |
| 5,726,911 | A * | 3/1998 | Canada | H02K 11/20 | 318/434 |
| 5,845,509 | A * | 12/1998 | Shaw | F04D 27/0261 | 417/5 |
| 5,961,291 | A * | 10/1999 | Sakagami | F04D 29/70 | 417/42 |
| 6,092,029 | A * | 7/2000 | Bently | F04D 27/02 | 702/56 |
| 6,445,995 | B1 * | 9/2002 | Mollmann | G01P 3/481 | 235/103 |
| 8,322,223 | B2 * | 12/2012 | Arar | G01B 21/24 | 73/659 |
| 8,960,009 | B2 * | 2/2015 | Takahashi | G01H 1/003 | 73/660 |
| 2008/0292469 | A1 * | 11/2008 | Taniguchi | F04D 27/0276 | 417/15 |
| 2010/0296914 | A1 * | 11/2010 | Staroselsky | F04D 27/001 | 415/47 |
| 2012/0107094 | A1 * | 5/2012 | Lillis | F01D 17/06 | 415/118 |
| 2013/0142617 | A1 * | 6/2013 | Rossi | F04D 29/661 | 415/118 |
| 2013/0195618 | A1 * | 8/2013 | Kleynhans | F04D 29/063 | 415/110 |
| 2013/0309060 | A1 * | 11/2013 | Johnsen | F04D 27/001 | 415/118 |
| 2017/0097006 | A1 * | 4/2017 | Hossain | F04D 29/058 | |

FOREIGN PATENT DOCUMENTS

| | | | | | |
|---|---|---|---|---|---|
| CN | 102016322 | A | | 9/2015 | |
| CN | 105782075 | A | * | 7/2016 | |
| DE | 4327506 | A1 | | 2/1994 | |
| DE | 102006011613 | A1 | * | 9/2007 | |
| DE | 10 2010 001 538 | A1 | | 8/2011 | |
| DE | 102013102648 | A1 | * | 9/2014 | |
| EP | 1 961 964 | A2 | | 8/2008 | |
| EP | 2093866 | A1 | * | 8/2009 | F04D 17/12 |
| KR | 20010081670 | A | | 8/2001 | |
| KR | 20160087299 | | * | 7/2016 | F04D 17/10 |
| KR | 20160087299 | A | * | 7/2016 | |
| WO | 2010117868 | A2 | | 10/2010 | |
| WO | WO-2010118976 | A1 | * | 10/2010 | |

OTHER PUBLICATIONS

International Preliminary Report on Patentability for corresponding International Patent Application No. PCT/EP2019/058236 dated Jul. 5, 2019.

International Search Report and translation for corresponding International Patent Application No. PCT/EP2019/058236 dated Jul. 5, 2019.

* cited by examiner

METHOD FOR CONTROLLING AT LEAST ONE RADIAL BLOWER IN A COOLING SYSTEM, AND RADIAL BLOWER

RELATED APPLICATION DATA

This application is a National Phase of International No. PCT/EP2019/058236 filed Apr. 2, 2019, which claims priority to German Patent Application No. 10 2018 108 827.2 filed on Apr. 13, 2018, all of which are hereby incorporated herein by reference.

FIELD OF THE INVENTION

The invention relates to a method for controlling at least one radial blower in a cooling system and a cooling system.

BACKGROUND

A radial blower for a gas laser is known from DE 10 2010 001 538 A1. Such a radial blower comprises an engine, which is formed by a rotor and a stator, between a first and second radial bearing, in particular a radial gas bearing. An impeller is provided on a shaft in the housing of the radial blower, which is rotatably driven by the engine, in order to circulate the laser gas of a laser assembly. This radial blower further comprises an axial gas bearing, which is positioned at a distance from the impeller, wherein the engine with the first and second radial bearing arranged directly adjacently to it is positioned between the axial gas bearing and the impeller. A pressure medium is supplied to the radial gas bearings and the axial gas bearing by channels in the housing, in order to form a hydrodynamic bearing.

Such radial blowers are also suitable for incorporation into a cooling system. When the cooling system is in operation, in particular the radial blower(s), it is necessary for the operating points of the radial blower to be monitored. Because of a continuously changing surrounding temperature, the amount of heat to be cooled and necessary temperature of the cooling system, the operating points of such a cooling system are continuously changed. These changes have an effect on the radial blower. It can either result in overloading of the radial blower and thus to damages or the operative range is not optimally used.

An electric engine having a functional monitoring system of the engine bearings is known from DE 10 2013 102 648 A1. This electric engine comprises a stator having a rotor mounted rotatably relative to it in bearing arrangements and an engine housing and a vibration sensor for receiving vibrations emerging in the electric engine which are caused by functional disturbances at the bearing arrangements.

A single-level centrifugal pump having an axial thrust compensation device is known from DE 10 2006 011 613 A1, wherein an impeller connected to a shaft is rotatably arranged in the housing of the centrifugal pump. At least one split ring seal arranged between the impeller and housing forms a relief chamber, wherein the relief chamber is attached to the pressure region of the centrifugal pump by a pressure-transferring connection. A shaft seal is arranged between the shaft and housing. This shaft is provided with at least one roller bearing receiving axial forces.

A turbo vacuum pump is known from DE 43 27 506 A1. This has a housing which is provided with a suction opening and a conveying opening. An evacuation pump arranged in the housing compresses the gas suctioned through the suction opening, said gas being dissipated through the conveying opening. Furthermore, an engine is provided for driving the evacuation pump.

SUMMARY OF THE INVENTION

The object of the invention is to propose a method for controlling at least one radial blower in a cooling system and a radial blower, whereby an energy efficiency maximum of the radial blower(s) and thus of the cooling system is achieved.

This object is solved by a method for controlling at least one radial blower in a cooling system in which the radial blower comprises a housing, in which a shaft is rotatably mounted, which, on one end, receives at least one impeller of a compressor, which is fixed on the housing and comprises at least one radial bearing and at least one axial gas bearing, by means of which the shaft is rotatably mounted in the housing, and has an engine, which is driven by a rotor and a stator, wherein the engine is provided between the first and second radial bearing, wherein operating points of the shaft are detected by at least one vibrometer, which is allocated to the shaft, and forwarded to a controller for determining an operating state of the radial blower. As a result of monitoring the shaft, by means of which the at least one impeller of the radial blower is driven and the cooling is achieved because of the pressure medium or coolant accelerated and/or compressed by the at least one impeller, the current operating state of the radial blower can be detected, and a critical operating state can also be monitored at the same time. As a result of this direct monitoring of the shaft, a corresponding control can be made possible because of the currently detected operating situation, in order to prevent the radial blower exceeding a critical operating state or threshold value, on one hand, and to control an optimal efficiency value, on the other hand.

Preferably, a critical threshold value is detected by the controller of the radial blower, and exceeding the threshold value is prevented by the controller of the radial blower itself or alternatively by the controller of the cooling system. Here, the controller can intervene to the effect that the engine is limited or reduced in relation to its control in terms of the rotational speed, in order to rotatably drive the shaft below the critical threshold value.

Furthermore, with several radial blowers provided in a cooling system, operating points are preferably detected by the respectively at least one vibrometer, the respective operating points of the radial blower are compared to one another and set to the maximum energy efficiency of the respective radial blower. Such a control and monitoring has the advantage that the respective controllers for the radial blower independently carry out a control for achieving an energy efficiency maximum, this means that each radial blower can function at its own energy efficiency maximum independently of one another, and thus an optimal efficiency of the cooling system as a whole is obtained. This leads to a cluster of several radial blowers being able to be operated at a regulated energy minimum for the cooling system. Independently of this, the self-protection function of each individual radial blower in relation to its critical threshold value is preferably maintained.

With several radial blowers in a cooling system, these are preferably connected to one another with data lines in a network. In particular, a bus system is provided. Thus, a quick communication and a mutual exchange of the individual operating points can be made possible.

Furthermore, with several radial blowers in the cooling system, one of the radial blowers is preferably operated as the master and the further radial blowers as slaves. Thus, the further radial blowers operated as slaves are respectively correspondingly switched by the master based on its present measurements in such a way that this cluster of radial blowers functions at a regulated energy minimum.

A further advantageous design of the method provides that the signals detected by the vibrometer are permanently evaluated. Thus, a complete control and monitoring can be obtained.

The object underlying the invention is furthermore solved by a radial blower, which comprises a housing in which a shaft is rotatably mounted which, on one end, receives at least one impeller of a compressor, which is fixed on the housing and has at least one radial bearing and at least one axial gas bearing, by means of which the shaft is rotatably mounted on the housing, wherein the shaft is driven by a motor by a rotor and stator, wherein at least one vibrometer is provided which is allocated to the shaft. By ascertaining the operating points directly on the shaft, an exact detection of an operating state of the radial blower can be obtained. Thus, critical operating points or exceeding threshold values of the bearing and/or the radial blower can be recognised immediately and these can be counteracted. The data detected by the vibrometer are forwarded to the controller for the radial blower.

According to a first embodiment of the radial blower, the vibrometer is aligned radially to the shaft. Thus, in the event of a rotation of the shaft, emerging vibrations can be ascertained. A critical operating state of the shaft can be defined via the frequency and/or the amplitude of a vibrometer signal.

A further advantageous design of the radial blower provides that the at least one vibrometer is allocated to the shaft between the rotor of the engine and the radial bearing or axial gas bearing provided adjacently thereto. Thus, critical operating states can be detected directly after generating the rotational movement of the shaft.

Furthermore, a vibrometer can be provided on an end-face end of the shaft. Thus, an additional monitoring or a further parameter can be detected in order to evaluate critical operating states.

The at least one vibrometer is preferably positioned in a housing opening, such that it is allocated directly to the shaft. Preferably, the vibrometer is provided in the housing opening in a pressure medium-tight manner. Thus, on one hand, the radial gas bearing and/or axial gas bearing arranged adjacently thereto can be driven hydrodynamically, and on the other hand, an immediate detection of the shaft is made possible.

BRIEF DESCRIPTION OF THE DRAWINGS

The invention and other advantageous embodiments and developments thereof are described and explained in more detail below by means of the examples depicted in the drawings. According to the invention, the features that can be seen in the description and the drawings can be applied individually or together in any combination. Here are shown.

DETAILED DESCRIPTION

Figure 1:
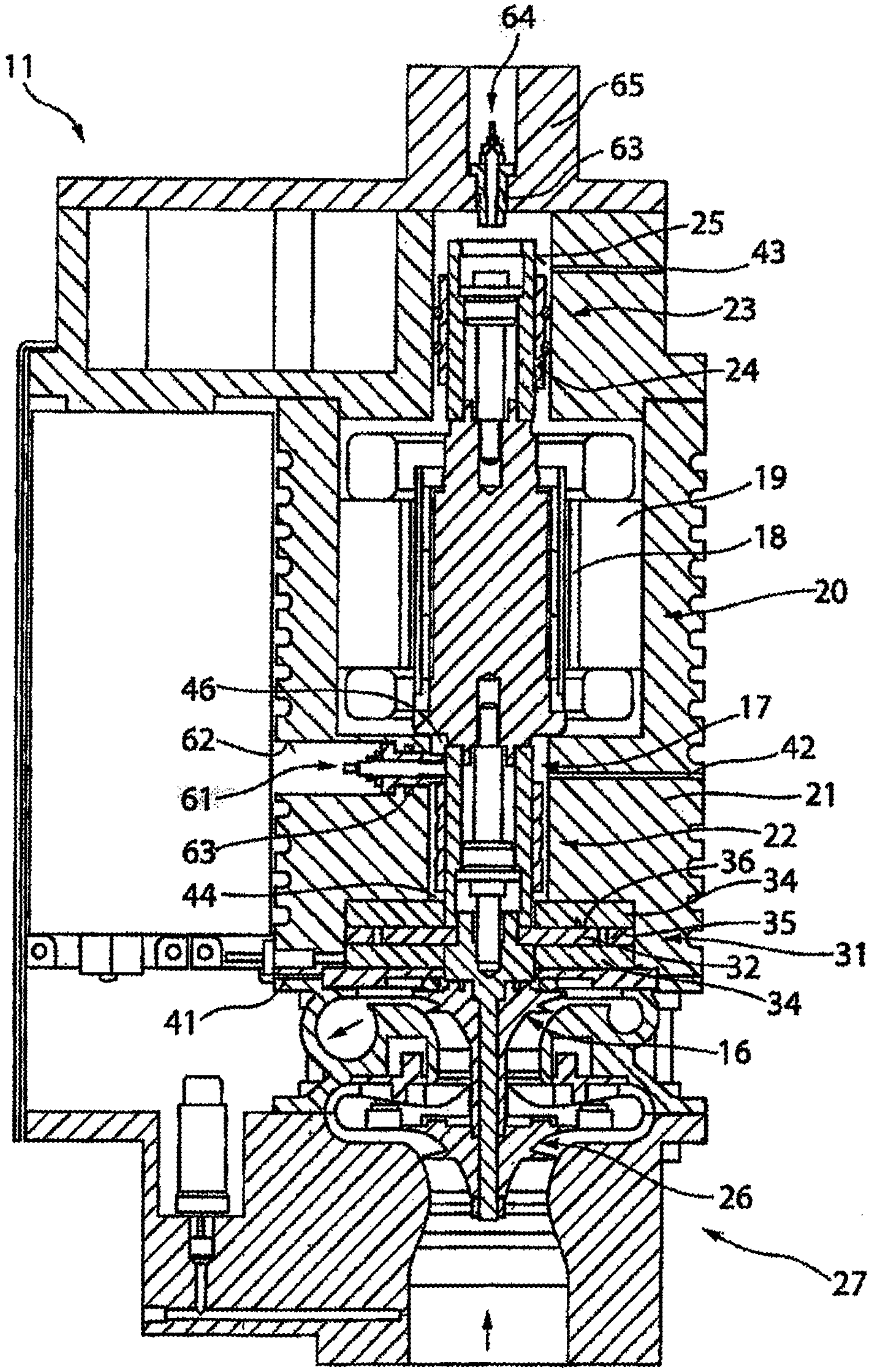
FIG. 1 a schematic sectional view of a radial blower.

In FIG. 1, a schematic sectional depiction of a radial blower 11 is depicted. By means of this radial blower 11, a coolant is radially accelerated by at least one impeller 16, 26 of a compressor 27 and led in lines of a cooling system 1, which is depicted by way of example in FIG. 3.

By means of this radial blower 11, the coolant is radially accelerated by at least one impeller 16, 26 of a compressor 27 and guided in a compressed state into the gas pressure line 75 (FIG. 3) of the compression side of the cooling system 1. The impeller 16, 26 rests on a shaft 17 which is driven in the central region of the engine housing 21 by an engine 20. This engine 20 consists of a rotor 18 connected to the shaft 17 and a stator 19 fixed on the engine housing 21. The region which is arranged outside of the impeller 16, 26 when seen from the shaft 17 forms the pressurise side of the blower. In the upper and lower region of the shaft 17, in each case a radial bearing 22, 23, in particular a lower radial gas bearing 22 and an upper radial gas bearing 23, are arranged. These radial gas bearings 22, 23 comprise stationary bearing surfaces which are referred to as the radial stator 24. Furthermore, the shaft 17 comprises rotating bearing surfaces 25 in the region of the radial gas bearings 22, 23. The pressure medium for the gas bearing is advantageously the coolant. An axial gas baring 31 is provided between the impeller 16 of the compressor 27 and the lower radial gas bearing 22. This axial gas bearing 31 comprises a rotating plate 32 and, adjacently to the plate 32 or on its upper side and lower side, axial stators 32 which each have stationary bearing surfaces 35. The plate 32 comprises rotating bearing surfaces 36 which lie opposite the stationary bearing surface 35. Between the axial gas bearing 31 and impeller 16, a channel 41, which are connected to the compression side of the cooling system 1, leads below the impeller 16. The pressurised coolant is guided below the impeller 16 by this channel 41 in a gaseous state in order to protect the axial gas bearing 31 from the ingress of particles.

Preferably, the rotating bearing surfaces 25 of the radial gas bearing 22 and/or the rotating bearing surfaces 36 of the axial gas bearing 31 have surfaces which comprise grooves. Fishbone patterns are preferably provided. Such grooves or surface indentations are preferably introduced using an ultra-short pulse laser, in particular picosecond laser. This enables a processing with very short processing times. Moreover, this processing step does not require reworking and meets the high demands of the precise design. The very short laser impulses in the microsecond range lead to a direct sublimation of the material. Thus, a production of these grooves can be provided which does not require reworking, in particular is free from burrs. In particular, an ion beam method is used. Alternatively, a micro-machining can also be provided.

In an installation situation, the radial blower 11 is aligned vertically in the cooling system 1. Here, the compressor 27 is aligned downwards, and the engine housing 21 is aligned vertically upwards. The radial blower 11 can advantageously be arranged directly above a flooded evaporator 66, such that, where necessary, condensate emerging when the cooling system 1 is at a standstill flows downwards back into the evaporator 66.

Figure 2:
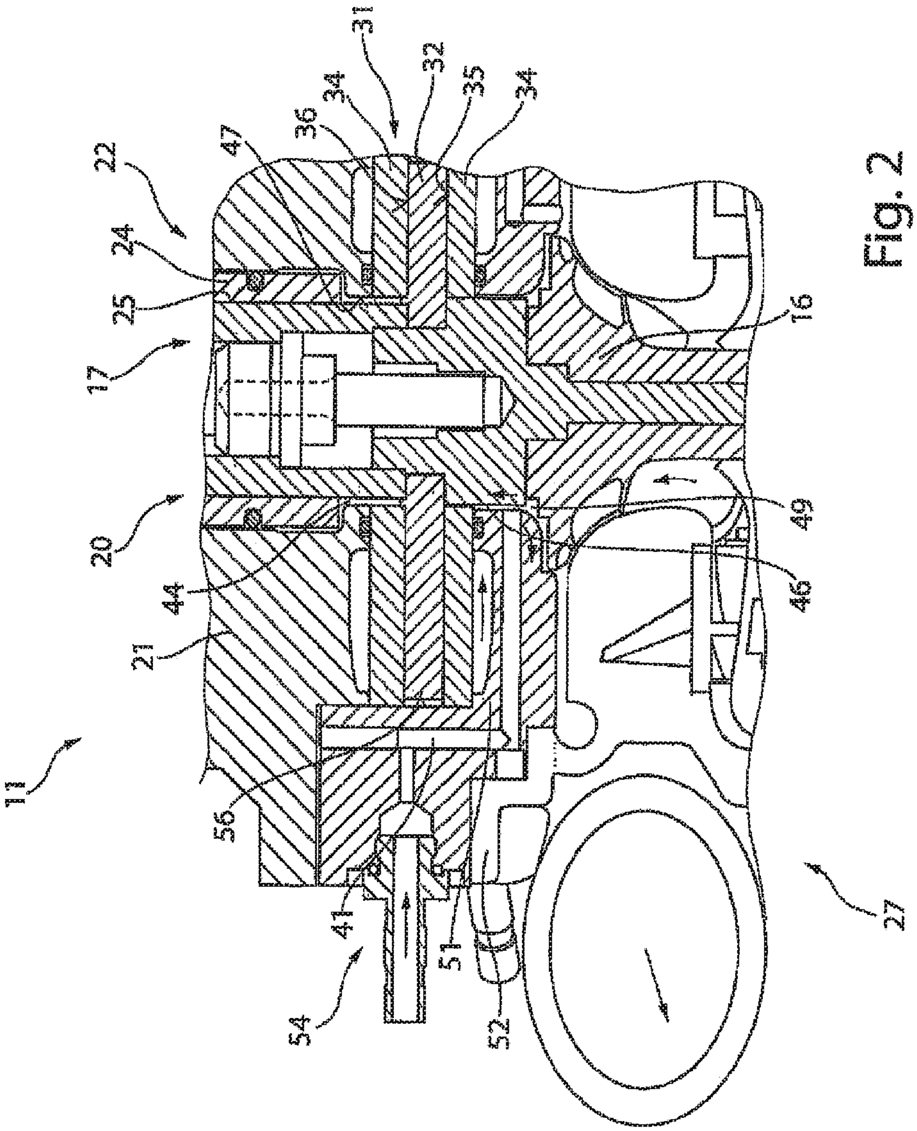
FIG. 2 a schematically enlarged view of an axial gas bearing adjacent to the compressor, and FIG. 3 a schematic view of a cooling system.

In FIG. 2, a schematically enlarged view of the axial gas bearing 31 and a connection of the compressor 27 to the engine housing 21 of the radial blower 11 is depicted. The connection of the compressor 27 with its housing 52 to the engine housing 21 of the radial blower 11 is carried out without using a labyrinth sealing or similar. The supply of the pressurised coolant via the channel 41 is used to prevent an ingress of particles into the axial gas bearing 31. The axial gas bearing 31 itself has such a narrow gap between the bearing surfaces 35 of the stator 34 and the bearing surfaces 36 of the rotating plate 32 that a seal between a rotor chamber 46 in the housing 21 and a gas chamber 49 in the compressor 27 is formed by the axial gas bearing 31 itself. Seen in the radial direction, the rotor chamber 46 is formed between a through-hole 47 in the engine housing 21 and the shaft 17 mounted therein. The gas chamber 49 is formed between a housing portion 51 of the engine housing 21 or housing 52 of the compressor 27 and the impeller 16. A housing 52 of the compressor 27 preferably engages around the housing portion 51 and is fixedly connected to the engine housing 21 outside of this housing portion 51.

A pressure port 54 for the pressurised coolant is provided on the engine housing 21, which is supplied to the channel 41. In a region in which the rotor chamber 46 and the gas chamber 49 are adjacent to each other, the coolant flows mainly in the direction of the gas chamber 49; the gas flow is held off through the axial bearing 31 in the counter-direction, which seals the rotor chamber 46.

A seal between a pressure side of the compressor 27 and the engine housing 21 is carried out as a result of this arrangement. The compressor 27 is preferably formed as a multi-step compressor or turbo compressor. A first step forms the impeller 26, and the second step forms the impeller 16. In particular, the seal between the pressure side of the second step or the impeller 16 of the compressor 27 and the engine housing 21 of the radial blower 11 can be carried out. In this way, a lower pressure can be set in the engine housing than on the pressure side of the compressor 27, whereby a condensation of the coolant in the radial bearings 22, 23 is prevented. Furthermore, the pressure port 54 can preferably have a filter element. This serves to prevent any particles reaching the compressor 27 and/or the axial gas bearing 31.

This radial blower 11 can furthermore have a heating device 56 in the region of the axial gas bearing 31 or adjacent to an axial stator 34 or between the two axial stators 34. Such a heating device 56 serves to heat the axial gas bearing 31 to a temperature which is above the dew point of the coolant at an acting pressure. Thus, a condensation of the coolant can be prevented. Such a heating device 56 can be formed as an electrically driven heater, such as by a resistance heating element or a PTC element, for example.

A vibrometer 61 is preferably provided between the engine 20 and the lower radial gas bearing 22, said vibrometer being allocated to the shaft 17. This vibrometer 61 is a measuring device for quantifying mechanical vibrations. Such a vibrometer 61 can be used to measure vibration frequency and vibration amplitude. For example, a so-called laser Doppler vibrometer can be used. This vibrometer 61 is inserted into a housing opening 62 of the engine housing 21 and preferably arranged in a pressure-tight manner. This can be carried out by means of an O-ring seal 63, for example. Thus, the pressure in the rotor chamber 46 can be maintained for the hydrodynamic operation of the radial and axial gas bearings 22, 23, 31. A measuring surface of the vibrometer 61 is aligned tangentially to the peripheral surface of the shaft 17. Here, the measuring surface can advantageously lie on a bearing sleeve surrounding a radial gas bearing 22, 23. During the operation of the radial blower 11, the frequency and amplitude can be permanently detected by the vibrometer 61 and forwarded to a controller 71 of the radial blower or the cooling system. Thus, the current operating point or the operating points prevailing during cooling of the radial blower 11 can be ascertained. In addition, a comparison with a threshold value can be performed at the same time. Such a threshold value can be a critical operating state in which damage to the bearing(s) or further components of the radial blower is to be expected. In particular to the effect that there is blocking of the shaft 17 in the engine housing 21 or the impellers 16, 16 in the compressor 27.

Alternatively, a vibrometer 61 can additionally be provided between the engine 20 and the upper radial gas bearing 23.

A further vibrometer 64 can be provided for an additional monitoring of operating states of the radial blower 11, said vibrometer being positioned on the rotational axis of the shaft 17 and pointing onto an end-face end of the shaft 17 in relation to a measuring surface. Thus, eccentricities during the rotating drive of the shaft 17 can also be conceptively evaluated.

Analogously to the vibrometer 61, this additional vibrometer 64 is in turn positioned in a housing cover 65 in a medium-tight manner.

Figure 3:
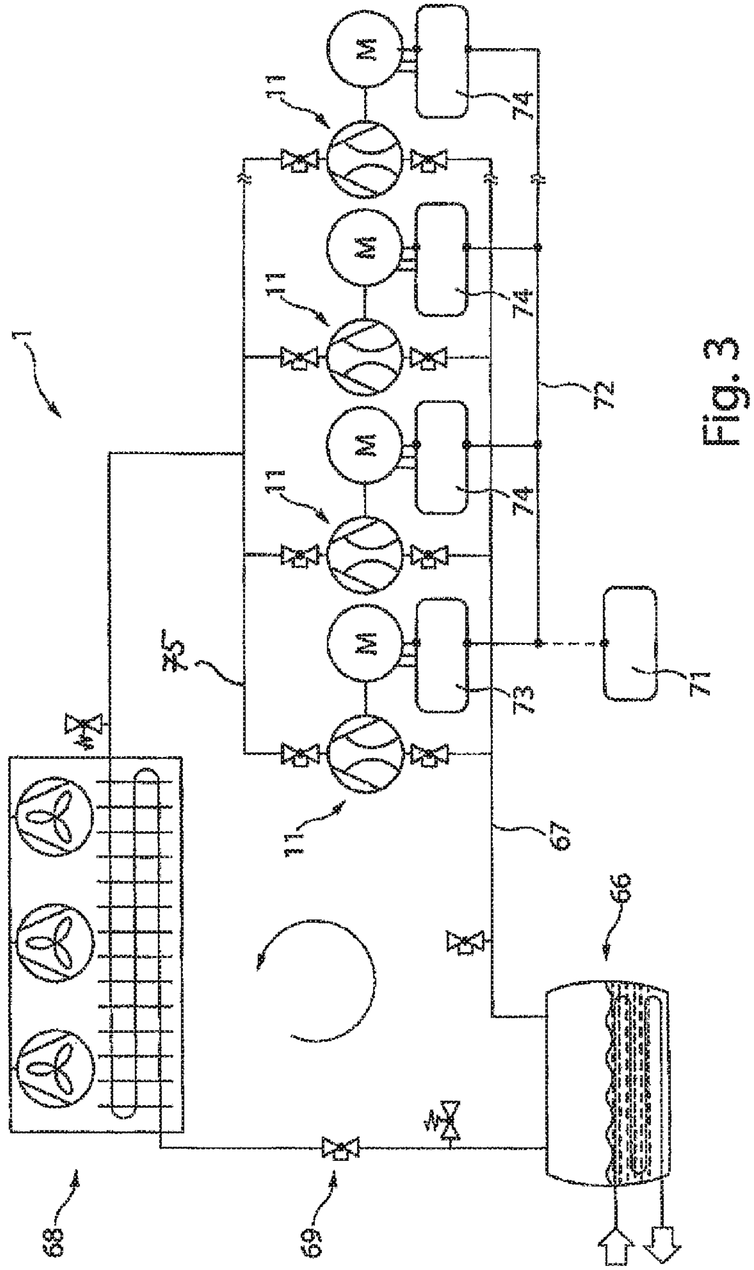

In FIG. 3, a schematic view of a cooling system 1 is depicted. This cooling system 1 is only exemplary and functions according to the principle of evaporation chill in particular. A coolant is in an evaporator 66. The necessary energy or heat to evaporate the coolant is drawn from the surroundings. The coolant receives this energy and converts into a gaseous state. In the gaseous state, the coolant is supplied to one or, according to the exemplary embodiment, several radial blowers 11 via a line 67, said radial fans each having a compressor 27. The coolant is compressed to a high pressure and a high temperature, which is respectively higher than the starting pressure and the starting temperature before the compressor 11. Then the coolant is supplied to a condenser or a capacitor 68. The coolant is condensed in this condenser by cooling. Then the coolant with high pressure is led through a throttle member, in particular an expansion valve 69. The coolant expands or is transferred to lower pressure and can be supplied to the evaporator 66 in the liquid state in order to in turn remove the heat from the surroundings. The cooling system 1 is a closed cooling circuit.

A controller 71 of the cooling system 1 is provided to control the individual radial fan 11, by means of which controller the individual radial fans 11 can be controlled. Preferably, the radial fans 11 are each connected to the controller 71 by a bus system 72. The compressor controller or a radial fan controller preferably functions according to the master-slave principle. The master function is allocated to one of the radial fans 11. The further radial fans 11 are operated as a cluster as so-called slaves 74. The controller 71 detects the measurements of the sensors of the radial fan by the master 73. Based on these detected or present measurements, the further radial fans are respectively switched on, such that the cluster of the radial fans 11 is operated in a regulated energy minimum. Here, a protective function of each individual radial fan 11 is maintained.

In order to obtain a safe operating range of the radial blower 11 in the cooling system 1, control-technical or regulatory algorithms are used in the controller 71 for controlling the radial blower 11 in such a way that no critical operating point can emerge for the respective radial blower 11. Furthermore, the radial blowers 11 can also communicate with one another via the bus system 72, in order to autonomously obtain the control for achieving an energy efficiency maximum based on the measurements present in the radial blower 11 itself, in particular based on the measurements present in the master radial blower 11.

The invention claimed is:

1. A method for controlling at least one radial blower in a cooling system, in which the at least one radial blower comprises a housing in which a shaft is rotatably mounted which, on one end, receives at least one impeller of a compressor, the compressor being fixed on the housing, and the housing comprises at least one radial bearing and at least one axial gas bearing, by means of which the shaft is rotatably mounted in the housing, and an engine comprising a rotor and stator, said engine driving the shaft, wherein the at least one radial blower includes a first vibrometer and a second vibrometer, wherein a measuring surface of the first vibrometer is directly pointing radially to the shaft and wherein the second vibrometer is positioned on a rotational axis of the shaft and pointing onto an end-face of the shaft and wherein operating points of the shaft are detected by at least one of the first and second vibrometers, which are pointing to the shaft, and are forwarded on to a controller of the cooling system for ascertaining an operating state of the at least one radial blower, wherein the operating points include vibrations generated by rotation of the shaft;

wherein the at least one radial blower comprises a plurality of radial blowers provided in the cooling system, and wherein each of the radial blowers of the plurality of radial blowers includes respective first and second vibrometers, wherein the operating points of each of the radial blowers of the plurality of radial blowers provided in the cooling system are detected by means of the respective first and second vibrometers, and the respective operating points are compared to one another and each of the radial blowers of the plurality of radial blowers is set to a maximum energy efficiency.

2. The method according claim 1, wherein the plurality of radial blowers are connected to one another in the cooling system with a network of data lines for exchanging data.

3. The method according to claim 1, wherein the plurality of radial blowers comprises a radial blower operated as a master and further radial blowers operated as slaves.

4. The method according to claim 1, wherein the operating points detected by the first and second vibrometers are evaluated, and the at least one radial blower is constantly monitored.

5. The method according claim 1, wherein the plurality of radial blowers are connected to one another in the cooling system with a bus system for exchanging data.

* * * * *